US005795601A

United States Patent [19]

Yamada et al.

[11] Patent Number: 5,795,601

[45] Date of Patent: Aug. 18, 1998

[54] APPARATUS FOR SUPPLYING INORGANIC SLURRY TO AN INJECTION MOLD

[75] Inventors: Kazuyuki Yamada; Yuji Saito, both of Wako, Japan

[73] Assignee: Honda Giken Kogyo Kabushiki Kaisha, Tokyo, Japan

[21] Appl. No.: 673,870

[22] Filed: Jul. 2, 1996

[30] Foreign Application Priority Data

Jul. 10, 1995 [JP] Japan .................................... 7-196968

[51] Int. Cl.$^{6}$ .................................................. B29C 45/63

[52] U.S. Cl. ........................... 425/580; 423/242; 425/584

[58] Field of Search .................................... 425/580, 584, 425/84, 86; 423/242

[56] References Cited

U.S. PATENT DOCUMENTS

| | | | |
|---|---|---|---|
| 4,948,087 | 8/1990 | Hisaeda et al. | 425/84 |
| 5,100,643 | 3/1992 | Brna et al. | 423/242 |
| 5,259,749 | 11/1993 | Meixner et al. | 425/584 |

FOREIGN PATENT DOCUMENTS

| | | | |
|---|---|---|---|
| 3604751 | 8/1986 | Germany | 425/584 |
| 1156006 | 6/1989 | Japan . | |
| 5138624 | 6/1993 | Japan . | |
| 2104438 | 3/1983 | United Kingdom | 425/584 |

*Primary Examiner*—Tim Heitbrink
*Attorney, Agent, or Firm*—Lyon & Lyon LLP

[57] ABSTRACT

A slurry tank which stores an inorganic slurry includes a funnel-shaped lower tank portion having a discharge port. A valve is positioned in the slurry tank above the discharge port and complementary in shape to an inner surface of the funnel-shaped lower tank portion of the slurry tank. The valve can be moved by an actuator selectively out of the discharge port to allow the inorganic slurry to be discharged from the discharge port and into the discharge port to stop discharging the inorganic slurry from the discharge port. A proportional pump is connected to the discharge port for supplying the inorganic slurry at a constant rate to a mold for injection molding when the valve is moved out of the discharge port by the actuator. A cylinder is connected to the proportional pump for being supplied with the inorganic slurry from the proportional pump and the cylinder opens into the mold. A plunger movably disposed in the cylinder applies the desired pressure on the inorganic slurry from the cylinder into the mold.

18 Claims, 7 Drawing Sheets

FIG. 3
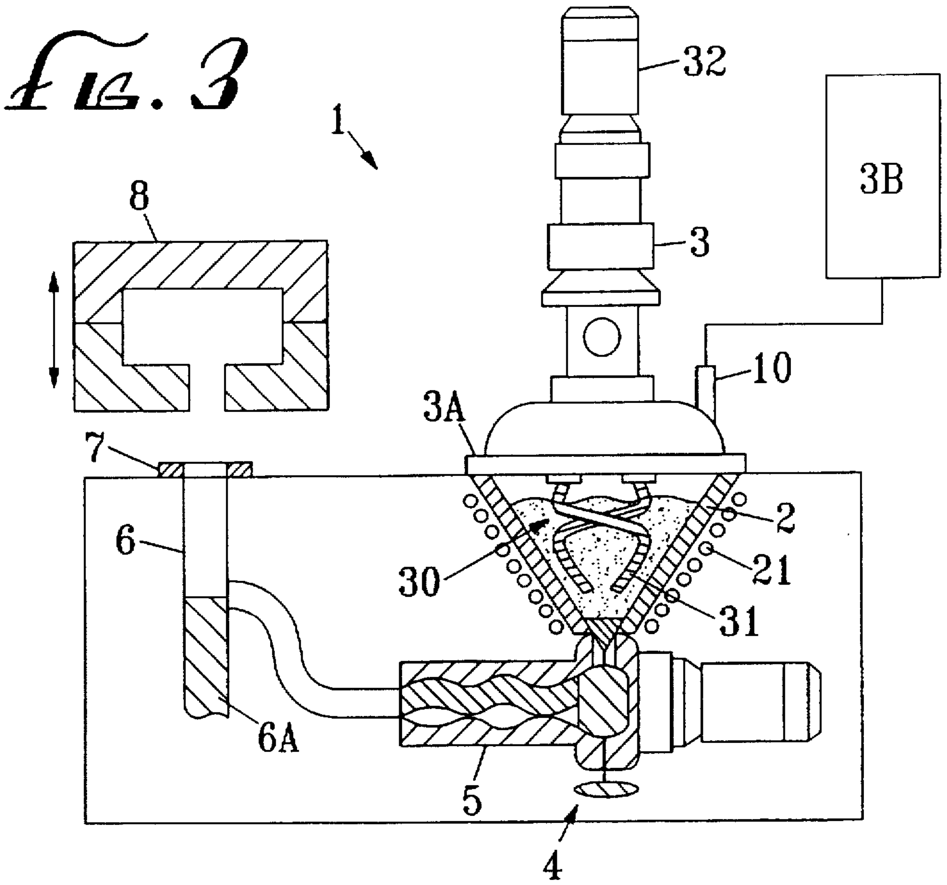
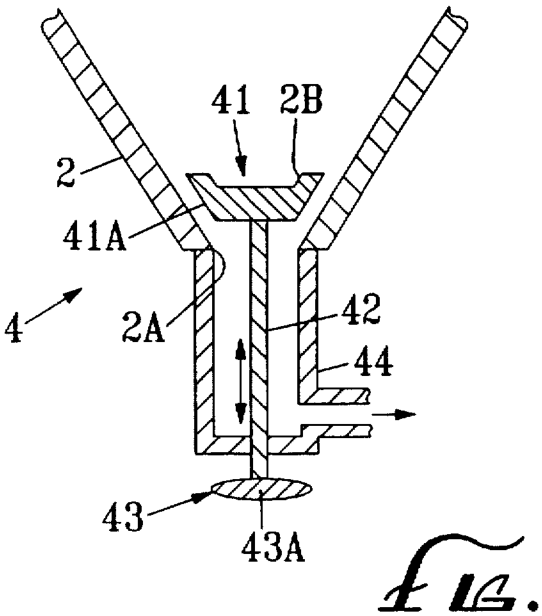
FIG. 4

APPARATUS FOR SUPPLYING INORGANIC SLURRY TO AN INJECTION MOLD

BACKGROUND OF THE INVENTION

1. Field of the Invention

The present invention relates to an apparatus for supplying an inorganic slurry to a mold for injection molding, and more particularly to a slurry supply apparatus capable of supplying an inorganic slurry continuously to a mold for injection molding without air being entrapped in the inorganic slurry.

2. Description of the Prior Art

Inorganic materials including ceramic powders, metal powders, etc. can be molded to shape by pressing molding, extrusion molding and injection molding among other molding processes. Molded bodies of a relatively simple shape can be produced by pressing molding or extrusion molding. However, it is general practice to mold relatively complex bodies according to injection molding.

FIG. 1 of the accompanying drawings shows a conventional injection molding apparatus 9 for injection-molding an inorganic slurry. As shown in FIG. 1, the conventional injection molding apparatus 9 generally comprises a slurry tank 92, a mold 98 and a pipe 94 interconnecting the slurry tank 92 and the mold 98. When air is introduced under pressure into the slurry tank 92, an inorganic slurry 91 stored in the slurry tank 92 is forced out of the slurry tank 92 through the pipe 94 into a mold cavity defined in the mold 98. When the slurry tank 92 runs out of the inorganic slurry 91, the slurry tank 92 is opened and receives a new supply of inorganic slurry 91. The conventional injection molding apparatus 9 suffers problems in that air tends to be entrapped in the inorganic slurry 91 when the inorganic slurry 91 is supplied to the mold 98, the slurry tank 92 cannot easily be replenished with the inorganic slurry 91, it is difficult to control the rate at which the inorganic slurry 91 flows toward the mold 98, and the pressure applied to force the inorganic slurry 91 into the mold 98 is not stable.

It has been considered that air is entrapped in the inorganic slurry 91 according to the following mechanism: When the slurry tank 92 is running short of the inorganic slurry 91, a large recess is formed centrally in the upper surface of the inorganic slurry 91 in the slurry tank 92, as shown in FIG. 2 of the accompanying drawings, due to adhesion between the inorganic slurry 91 and an inner wall surface of the slurry tank 92. When the recess thus formed reaches the lower open end of the slurry tank 92, air is entrained into the inorganic slurry 91 through the recess, and flows together with the inorganic slurry 91 through the pipe 94 toward the mold 98. An experiment conducted on the conventional injecting molding apparatus 9 shown in FIG. 1 confirmed that a molded body produced of 2 liters of inorganic slurry 91 supplied from the slurry tank 92 having a volume of 4 liters entrapped a large proportion of air therein.

Various attempts have heretofore been made in order to solve the above problems. For example, Japanese laid-open patent publication No. 1-156006 discloses an injection molding apparatus for injection-molding ceramic materials which comprises a slurry tank and a preliminary chamber having a piston. The slurry tank is connected to the preliminary chamber which in turn is connected to a mold. A slurry contained in the slurry tank is first introduced into the preliminary chamber by compressed air, and then forced into the mold by the piston.

An injection molding apparatus for injection-molding a low-viscosity slurry as revealed in Japanese laid-open patent publication No. 5-138624 has a smaller-diameter cylinder for forcing the slurry into a mold at a desired rate and a larger-diameter cylinder for maintaining the slurry under a desired pressure. The slurry which is kept under the desired pressure by a larger-diameter piston in the larger-diameter cylinder is forced into the mold by a smaller-diameter piston in the smaller-diameter cylinder.

The above conventional injection molding apparatus are, however, problematic in that the process of supplying the slurry to the mold is complex and poor in efficiency because the slurry cannot continuously be supplied to the mold. Another shortcoming is that the conventional injection molding apparatus have no effective means for preventing air from being entrapped in the slurry.

SUMMARY OF THE INVENTION

It is therefore an object of the present invention to provide a slurry supply apparatus which is capable of supplying an inorganic slurry continuously to a mold for injection molding while preventing air from being entrapped in the inorganic slurry.

According to the present invention, one form of an apparatus for supplying an inorganic slurry to a mold for injection molding, comprises a slurry tank for storing an inorganic slurry, a valve mechanism for selectively open and closing a discharge port of the slurry tank, a proportional pump for delivering the inorganic slurry from the slurry tank to a cylinder, and a plunger movably disposed in the cylinder for forcing the inorganic slurry from the cylinder into a mold for injection molding. The slurry tank includes a funnel-shaped lower tank portion with the discharge port defined in a lower end thereof. The valve mechanism includes a valve positioned in the slurry tank above the discharge port and complementary in shape to an inner surface of the funnel-shaped lower tank portion of the slurry tank, and an actuator connected to the valve for vertically moving the valve selectively out of the discharge port to allow the inorganic slurry to be discharged from the discharge port and into the discharge port to stop discharging the inorganic slurry from the discharge port. The proportional pump is connected to the discharge port for supplying the inorganic slurry at a constant rate to the mold for injection molding when the valve is moved out of the discharge port by the actuator. The cylinder is connected to the proportional pump for being supplied with the inorganic slurry from the proportional pump, the cylinder opening into the mold. The plunger is movably disposed in the cylinder for applying a constant pressure on the inorganic slurry in the mold from the cylinder.

In another embodiment of the present invention, the plunger and cylinder are omitted and a servomotor is used to drive the proportional pump to both supply the slurry to the mold and then impose a constant pressure on the slurry in the mold.

The apparatus may further comprise vacuum deaerating means for deaerating the inorganic slurry in the slurry tank under vacuum, stirring means for stirring the inorganic slurry in the slurry tank, heating means combined with the slurry tank for heating the inorganic slurry in the slurry tank, and a lid mechanism for openably closing the slurry tank.

The vacuum deaerating means may be connected to the lid mechanism for deaerating the inorganic slurry in the slurry tank under vacuum when the slurry tank is closed by the lid mechanism. The stirring means may be mounted on the lid mechanism for stirring the inorganic slurry in the slurry tank when the slurry tank is closed by the lid mechanism.

The above and other objects, features, and advantages of the present invention will become apparent from the following description when taken in conjunction with the accompanying drawings which illustrate a preferred embodiment of the present invention by way of example.

BRIEF DESCRIPTION OF THE DRAWINGS

FIG. 3 is a schematic vertical cross-sectional view of a slurry supply apparatus for supplying an inorganic slurry to a mold for injection molding according to the present invention;

FIG. 4 is an enlarged fragmentary vertical cross-sectional view of a valve mechanism of the slurry supply apparatus shown in FIG. 3;

DETAILED DESCRIPTION OF THE PREFERRED EMBODIMENT

Figure 1:
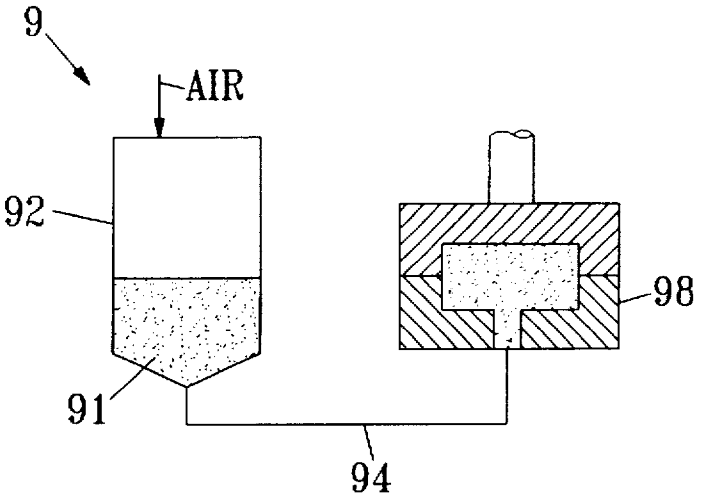
FIG. 1 PRIOR ART
FIG. 1 is a schematic vertical cross-sectional view of a conventional injection molding apparatus.
Figure 2:
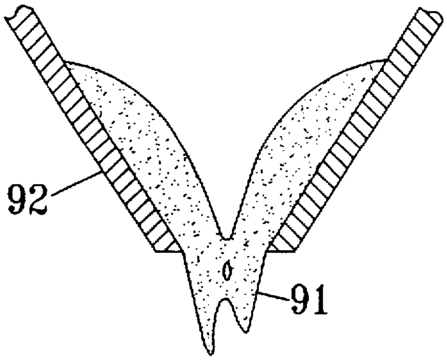
FIG. 2 PRIOR ART
FIG. 2 is an enlarged fragmentary vertical cross-sectional view showing the manner in which air is entrapped into a slurry in the conventional injection molding apparatus shown in FIG. 1.

As shown in FIG. 3, a slurry supply apparatus 1 for supplying an inorganic slurry to a mold for injection molding according to the present invention generally comprises a slurry tank 2 for storing an inorganic slurry, a lid mechanism 3 for hermetically closing the slurry tank 2, a valve mechanism 4 for controlling the supply of the inorganic slurry from the slurry tank 2, a proportional pump 5 for delivering the inorganic slurry from the slurry tank 2 to a mold 8 for injection molding, a cylinder 6 communicating with the proportional pump 5 and connected to a nozzle 7 which opens into the mold 8, and a plunger 6*a* movable in the cylinder 6 for forcing the inorganic slurry through the nozzle 7 into the mold 8.

The inorganic slurry may comprise a ceramic powder and/or a metal powder with an organic binder added thereto. The organic binder may comprise a low-molecular resin having a low melting point. The organic binder is melted into a slurry state in the slurry tank 2 and added to a ceramic powder and/or a metal powder.

The slurry tank 2 includes a funnel-shaped lower tank portion having a discharge port 2*a* (see FIG. 4) defined in its lower end. Since the organic binder is melted and added, the slurry tank 2 has a heating device for melting the organic binder. In the illustrated embodiment, the heating device comprises an electric heater 21 mounted on an outer wall surface of the slurry tank 2.

The lid mechanism 3 comprises a horizontal lid 3*a* for hermetically sealing the slurry tank 2 and a vacuum deaerator 3*b* for deaerating the inorganic slurry. The lid 3*a* may comprise a threaded structure by which the lid mechanism 3 and the slurry tank 2 can be fastened to each other and a gasket that can be disposed between the lid mechanism 3 and the slurry tank 2. The vacuum deaerator 3*b* comprises an evacuating device such as a vacuum pump connected to a suction port 10 of the lid mechanism 3 which opens into the slurry tank 2 when the slurry tank 2 is hermetically closed by the lid mechanism 3. The lid mechanism 3 is combined with a stirring device 30 for kneading the inorganic slurry in the slurry tank 2. Specifically, the stirring device 30 comprises a stirrer 31 mounted on a lower surface of the lid 3*a* so as to be positioned in the slurry tank 2 when the slurry tank 2 is hermetically closed by the lid mechanism 3, and a motor 32 mounted on an upper end of the lid mechanism 3 and operatively coupled to the stirrer 31. The vacuum deaerator 3*b* and the stirring device 30 may be mounted on an upper portion of the slurry tank 2, rather than being associated with the lid mechanism 3.

As shown in FIG. 4, the valve mechanism 4 comprises a valve 41 positioned in the slurry tank 2 above the discharge port 2*a* thereof, an actuator 43 connected to the valve 41 for vertically moving the valve 41 into and out of the discharge port 2*a*, and a pipe 44 connected to the discharge port 2*a* for delivering the inorganic slurry from the slurry tank 2 to the proportional pump 5. The valve 41 has a downwardly tapered outer surface 41*a* which is completely complementary in shape to an inner surface 2*b* of the funnel-shaped lower tank portion of the slurry tank 2. When the valve 41 is in its lowermost position, the downwardly tapered outer surface 41*a* is held in intimate contact with the inner surface 2*b* of a lower portion of the slurry tank 2, thus closing the discharge port 2*a*. At this time, the valve 41 fully stops discharging the inorganic slurry from the slurry tank 2 to the proportional pump 5, which is thus completely disconnected from the slurry tank 5.

When the valve 41 is lifted from the lowermost position, the outer surface 41*a* thereof is displaced upwardly away from the inner surface 2*b* of the slurry tank 2, creating a gap between the outer surface 41*a* and the inner surface 2*b*. The inorganic slurry contained in the slurry tank 2 can now be discharged through the gap and the discharge port 2*a* into the pipe 44.

The actuator 43 comprises a vertical screw 42 threadedly extending through the pipe 44 and having an upper end joined to the valve 41, and a manual handle 43*a* connected to a lower end of the vertical screw 42. When the manual handle 43*a* is manually turned by the operator, the valve 41 can be moved vertically. A gasket may be attached to the outer surface 41*a* or the inner surface 2*b* or both for hermetically sealing the discharge port 2*a* when the valve 41 closes the discharge port 2*a*.

The valve 41 whose outer surface 41*a* is shaped complementarily to the inner surface 2*b* of the slurry tank 2 guides the inorganic slurry to flow down the inner surface 2*b* while preventing a recess from being formed in the upper surface of the inorganic slurry. Even if a recess is formed in the upper surface of the inorganic slurry, the upper surface of the valve 41 is effective to substantially prevent the recess from being lowered into the vicinity of the discharge port 2*a* of the slurry tank 2. As a consequence, air is effectively prevented from being entrapped in the inorganic slurry as it is discharged from the slurry tank 2 to the proportional pump 5.

Figure 5:
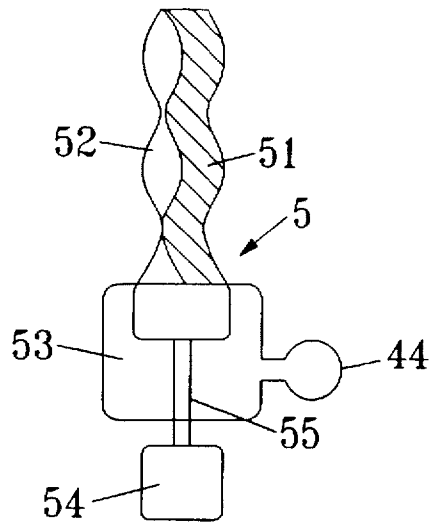
FIG. 5 is a sectional plan view showing the positional relationship between the valve mechanism and a proportional pump of the slurry supply apparatus shown in FIG. 3.

The proportional pump 5 serves to supply the inorganic slurry at a constant rate to the mold 8. The proportional pump 5 is connected to the pipe 44 and has a discharge port connected to the cylinder 6. As shown in FIG. 5, the proportional pump 5 is a known screw pump such as a Moineau pump and comprises a helical screw 51 eccentrically rotatably disposed in a sleeve 52 having a wavy inner surface. When the helical screw 51 is rotated, pockets defined between the helical screw 51 and the sleeve 52 move toward the discharge port of the proportional pump 5, carrying the inorganic slurry in the pockets toward the discharge port. Since the amount of the inorganic slurry that is displaced is governed by the number of revolutions of the helical screw 51, the proportional pump 5 can supply the inorganic slurry at a constant rate to the mold 8. The proportional pump 5 can easily control the rate at which the inorganic slurry is supplied to the mold 8. Another advantage of the proportional pump 5 is that it can be replenished with the inorganic slurry while the lid mechanism 3 is open.

FIG. 5 shows the positional relationship between the valve mechanism 4 and the proportional pump 5. As shown in FIG. 5, the proportional pump 5 has a suction chamber 53 connected to the pipe 44 of the valve mechanism 4. The helical screw 51 has one end connected to a motor 54 by a rod 55 extending across the suction chamber 53. When the valve mechanism 4 is opened, the inorganic slurry discharged from the slurry tank 2 enters the suction chamber 53 through the pipe 44.

As shown in FIG. 3, when the plunger 6*a* is displaced in the cylinder 6 toward the nozzle 7, the plunger 6*a* forces the inorganic slurry supplied to the cylinder 6 through the nozzle 7 into the mold 8.

As described later on, the mold 8 is not connected to the nozzle 7, but a vacuum pump is connected to the nozzle 7, until the inorganic slurry is prepared in the slurry tank 2 and delivered from the slurry tank 2 to the nozzle 7.

An injection molding process carried out by the slurry supply apparatus shown in FIG. 3 will be described below with reference to FIGS. 6 through 12.

Figure 6:
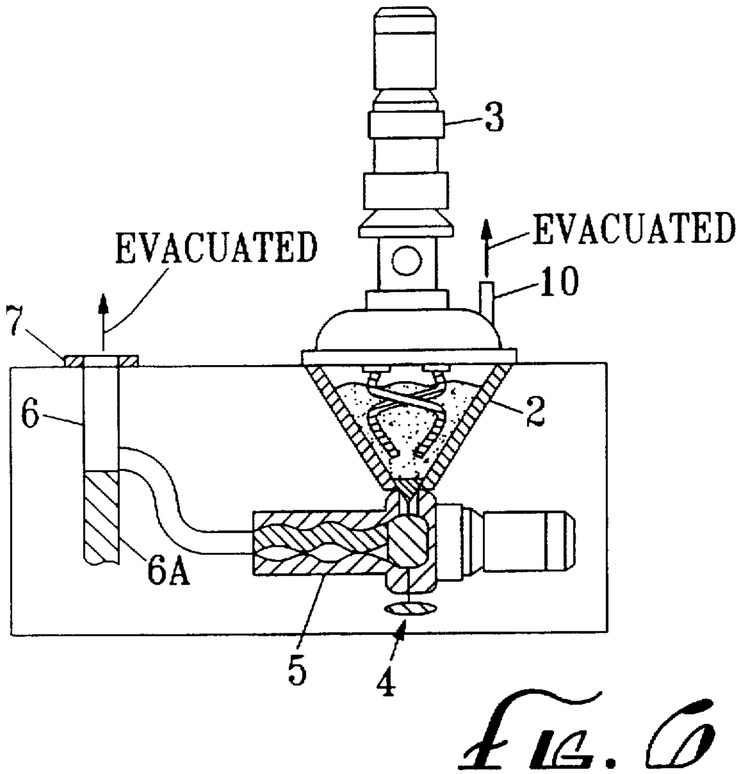

Step (1): First, the valve mechanism 4 is closed, and the lid mechanism 3 is opened. Materials of the inorganic slurry are charged into the slurry tank 2, and then the lid mechanism 3 is closed. After the charged materials are heated (if an organic binder is used), the slurry tank 2 is evacuated by the vacuum deaerator 3*b* which is connected to the suction port 10 and a vacuum pump which is connected to the nozzle 7, deaerating the materials in the slurry tank 2, and at the same time the materials in the slurry tank 2 are stirred by the stirring device 30, as shown in FIG. 6.

Figure 7:
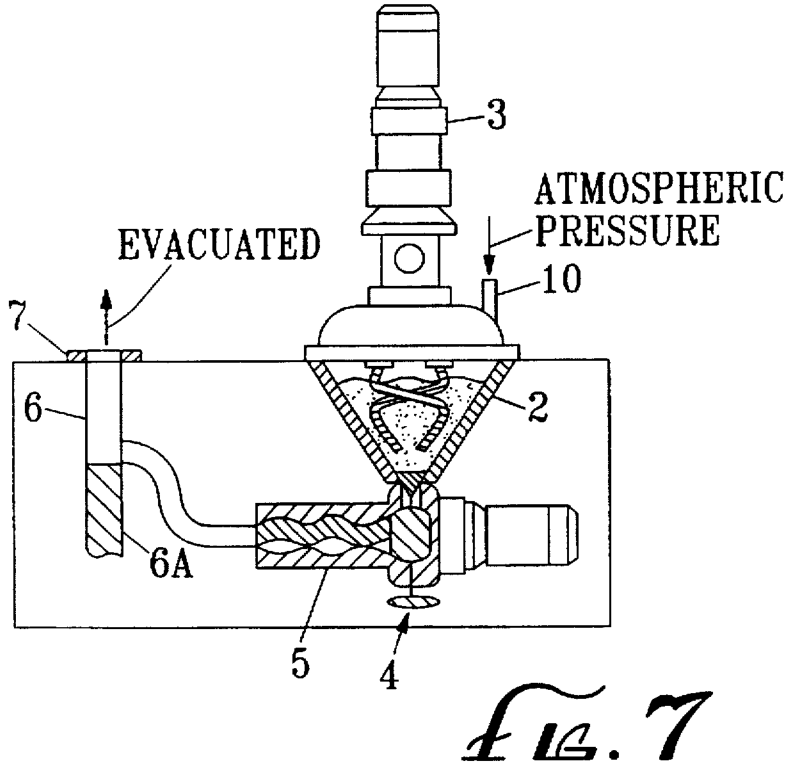

Step (2): After the prepared inorganic slurry is deaerated, the stirring device 30 is inactivated, and the suction port 10 is opened, i.e., the vacuum deaerator 3*b* is disconnected from the suction port 10, introducing the atmospheric pressure into the slurry tank 2, as shown in FIG. 7.

Figure 8:
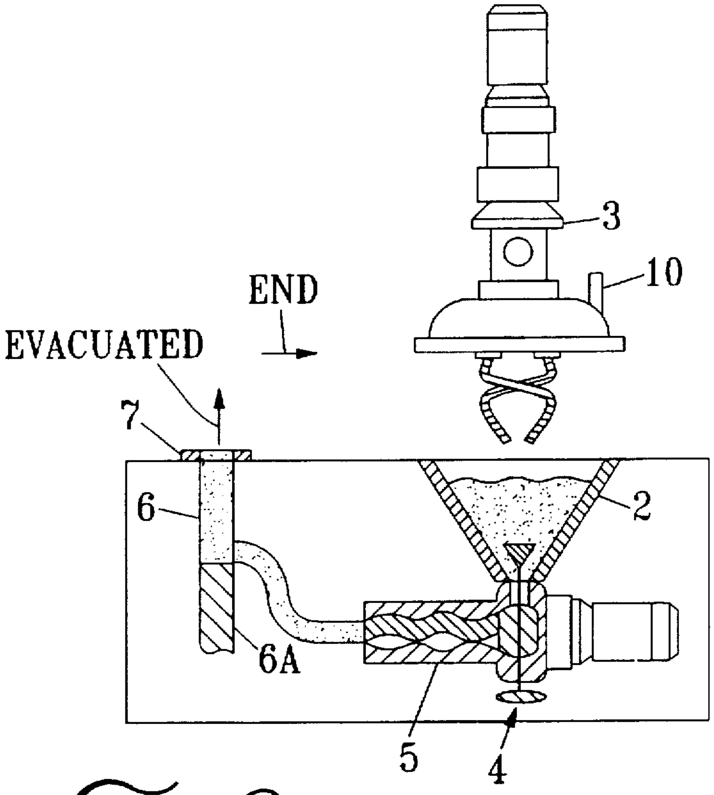

Step (3): The lid mechanism 3 is opened, and the valve mechanism 4 is opened. The cylinder 6 is evacuated by the vacuum pump connected to the nozzle 7 until the inorganic slurry drawn from the slurry tank 2 fills the nozzle 7, as shown in FIG. 8.

Figure 9:
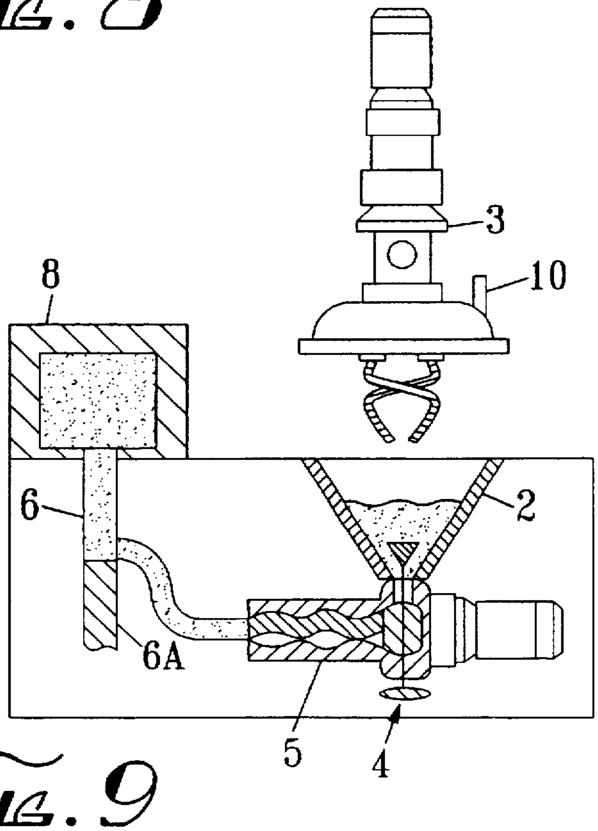

Step (4): Thereafter, the vacuum pump is disconnected from the nozzle 7, and the mold 8 is connected to the nozzle 7. The proportional pump 5 is operated to deliver the inorganic slurry from the slurry tank 2 into the mold 8 until the mold 8 is filled up with the inorganic slurry, as shown in FIG. 9.

Figure 10:
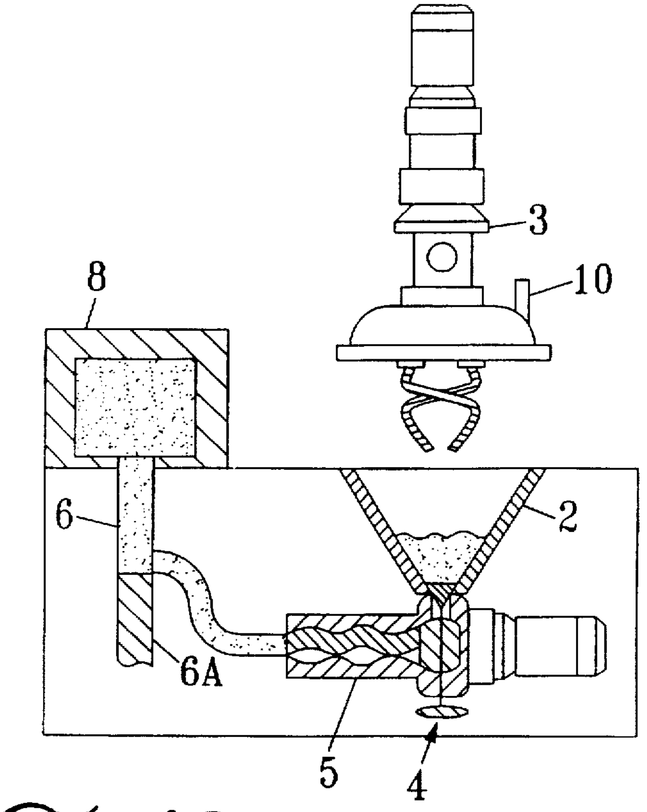

Step (5): After the mold 8 is filled up with the inorganic slurry, the proportional pump 5 is inactivated. The plunger 6*a* is moved upwardly to apply a pressure to the inorganic slurry in the mold 8, as shown in FIG. 10.

Figure 11:
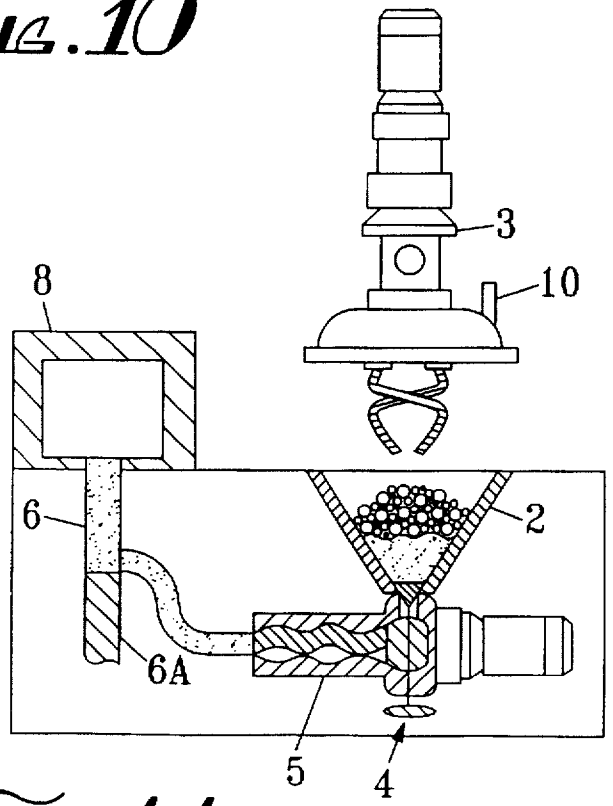

Step (6): The steps (4) and (5) are repeated to produce molded products in the mold 8 as long as a sufficient amount of inorganic slurry is available in the slurry tank 2. When the slurry tank 2 is running short of the inorganic slurry, the valve mechanism 4 is closed, and the lid mechanism 3 is opened. The materials of the inorganic slurry are charged into the slurry tank 2, as shown in FIG. 11, and then the lid mechanism 3 is closed.

Figure 12:
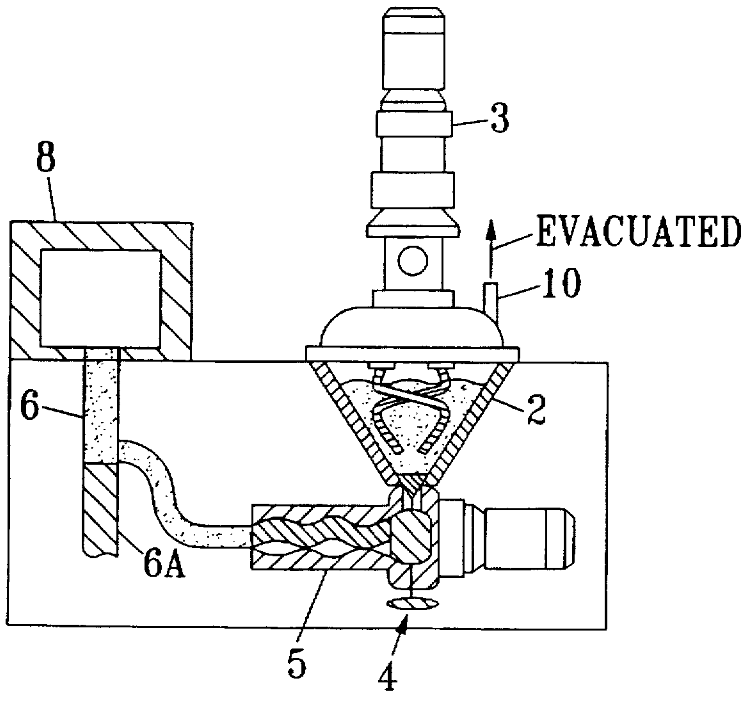
FIGS. 6 through 12 are schematic vertical cross-sectional views showing respective successive steps of an injection molding process carried out by the slurry supply apparatus shown in FIG. 3.

Step (7): As in the step (1), the slurry tank 2 is evacuated, deaerating the materials in the slurry tank 2, and at the same time the materials in the slurry tank 2 are stirred by the stirring device 30, as shown in FIG. 12 (Sheet 3).

Step (8): After the prepared inorganic slurry is deaerated, the stirring device 30 is inactivated, and the suction port 10 is opened, introducing the atmospheric pressure into the slurry tank 2. The lid mechanism 3 is opened and the valve mechanism 4 is opened. And the steps (4) and (5) are repeated to produce molded products in the mold 8.

Figure 13:
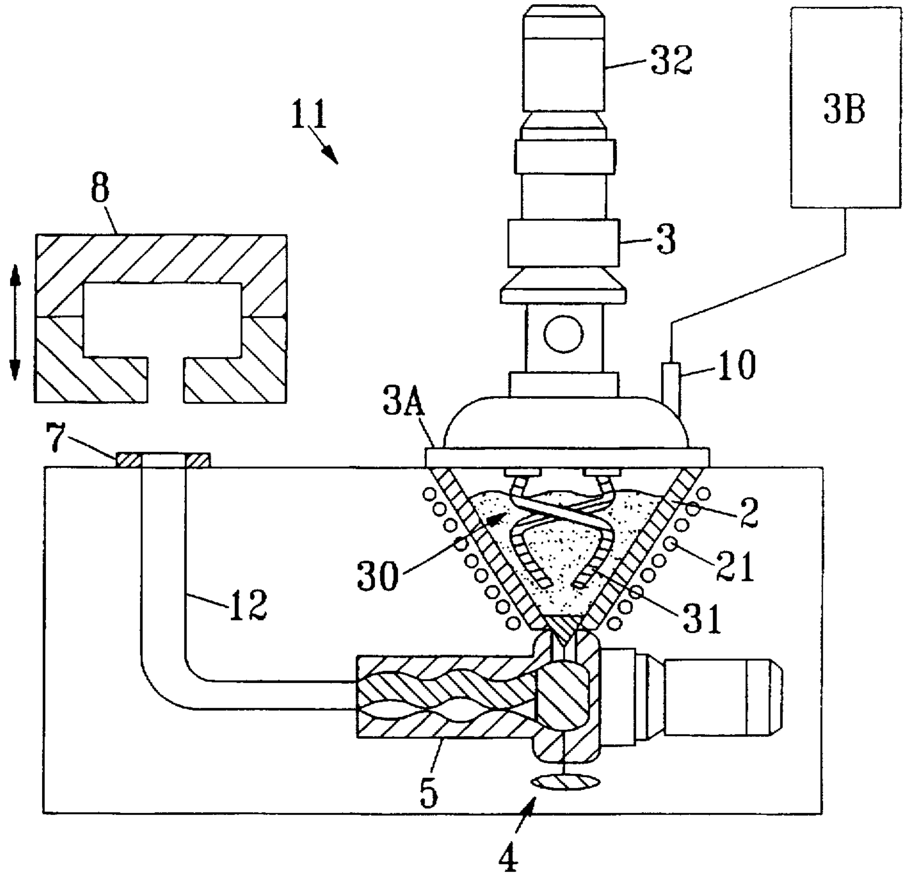
FIG. 13 is a schematic vertical cross-sectional view similar to FIG. 3 showing another embodiment of the slurry supply apparatus of the present invention.

Referring now to FIG. 13, the slurry supply apparatus 11 of this invention is another embodiment similar to apparatus 1 of FIGS. 3–12 and those elements and components that are the same in both embodiments are identified by the same numerals and will not be described again. The apparatus 11 differs from apparatus 1 in that the cylinder 6 and plunger 6*a* are omitted and a pipe 12 is connected directly from the output of pump 5 to the nozzle 7 leading to the mold 8. A servomotor is used as the motor 54 (FIG. 5) for applying, by the pump 5, a constant pressure on the slurry when the mold 8 is filled rather than using cylinder 6 and plunger 6*a* of the first embodiment. In all other respects, the embodiment of FIG. 13 operates in the same manner, including the steps of FIGS. 6–12.

The slurry supply apparatus may have at least two slurry tanks, and while the inorganic slurry is being supplied from one of the slurry tanks to the mold to produce a molded product, the inorganic slurry may be prepared in the other slurry tank by heating, mixing, and deaerating the materials charged into the slurry tank. Use of such at least two slurry tanks allows molded products to be successively and continuously formed by the mold.

The valve mechanism 4 and the proportional pump 5 are highly resistant to the entrapment of air into the inorganic slurry, and can continuously supply the inorganic slurry to the mold 8. Since no air is entrapped into the inorganic slurry and the inorganic slurry can be supplied to the mold 8 at a constant rate under constant pressure, the slurry supply apparatus can supply an inorganic slurry having a viscosity of 1000 poise or less to the mold 8 for forming molded products.

Although certain preferred embodiments of the present invention have been shown and described in detail, it should be understood that various changes and modifications may be made therein without departing from the scope of the invention defined by the appended claims.

What is claimed is:

1. An apparatus for supplying an inorganic slurry to a mold for injection molding, comprising:

a slurry tank for storing said inorganic slurry, said slurry tank including a funnel-shaped lower tank portion having a conical valve seat and a discharge port defined in a lower end thereof;

a valve mechanism including a valve positioned in said slurry tank above said discharge port, said valve having a complementary shaped conical outer rim for engaging said conical valve seat in said funnel-shaped lower tank portion of said slurry tank, and an actuator connected to said valve from below said discharge port for vertically moving said valve selectively (a) upwardly out of said discharge port and into said funnel-shaped lower tank portion above said discharge port to allow the inorganic slurry to be discharged from said discharge port and (b) downwardly into said discharge port whereby said conical outer rim of said valve engages said conical valve seat to stop discharging the inorganic slurry from said discharge port; and a proportional pump connected between said discharge port and the mold for supplying the inorganic slurry at a constant rate to the mold for injection molding when said valve is moved out of said discharge port by said actuator.

2. An apparatus according to claim 1, further comprising vacuum deaerating means for deaerating the inorganic slurry in said slurry tank under vacuum when said valve is moved into said discharge port by said actuator to close said discharge port.

3. An apparatus according to claim 1, further comprising stirring means for stirring the inorganic slurry in said slurry tank.

4. An apparatus according to claim 1, further comprising heating means combined with said slurry tank for heating the inorganic slurry in said slurry tank.

5. An apparatus according to claim 1, further comprising a lid mechanism for openably closing said slurry tank.

6. An apparatus according to claim 5, further comprising vacuum deaerating means connected to said lid mechanism for deaerating the inorganic slurry in said slurry tank under vacuum when said slurry tank is closed by said lid mechanism and said valve is moved into said discharge port by said actuator to close said discharge port.

7. An apparatus according to claim 5, further comprising stirring means mounted on said lid mechanism for stirring the inorganic slurry in said slurry tank when said slurry tank is closed by said lid mechanism.

8. An apparatus according to claim 1, further comprising:

a cylinder connected to said proportional pump for being supplied with the inorganic slurry from said proportional pump, said cylinder opening into the mold; and a plunger movably disposed in the cylinder for applying a constant pressure to the inorganic slurry in the mold.

9. An apparatus according to claim 1, further comprising means for driving said proportional pump for applying a constant pressure on the slurry in the mold.

10. An apparatus for supplying an inorganic slurry to a mold for injection molding, comprising:

a slurry tank for an inorganic slurry, said slurry tank having a discharge port defined in a lower end thereof;

a valve mechanism including a valve for selectively closing and opening said discharge port;

a pump connected to said discharge port for supplying the inorganic slurry from the slurry tank for injection molding when said valve is open;

a cylinder connected directly to said pump for being supplied with the inorganic slurry from said pump, said cylinder having an opening directly into the mold for supplying the inorganic slurry to the mold; and a plunger movably disposed in said cylinder for forcing the inorganic slurry from said cylinder directly into the mold and maintaining the inorganic slurry in the mold at a constant elevated pressure.

11. An apparatus for supplying an inorganic slurry to a mold for injection molding, comprising:

a slurry tank for an inorganic slurry, said slurry tank having a discharge port defined in a lower end thereof;

a valve mechanism including a valve for selectively opening and closing said discharge port, said slurry tank being air-tight when said discharge port is closed by said valve;

a vacuum deaerating means connected to said slurry tank for deaerating the inorganic slurry in said slurry tank by drawing a vacuum on said slurry tank only when said discharge port is closed by said valve; and a pump connected to said discharge port for supplying the inorganic slurry from the slurry tank to the mold only when said valve mechanism opens said discharge port.

12. An apparatus according to claim 11, further comprising vacuum deaerating means for deaerating the inorganic slurry in said slurry tank under vacuum when said valve mechanism is closed.

13. An apparatus according to claim 11, further comprising stirring means for stirring the inorganic slurry in said slurry tank.

14. An apparatus according to claim 11, further comprising heating means combined with said slurry tank for heating the inorganic slurry in said slurry tank.

15. An apparatus according to claim 11, further comprising a lid mechanism for openably closing said slurry tank.

16. An apparatus according to claim 11, further comprising stirring means mounted on a lid mechanism mounted on said slurry tank for stirring the inorganic slurry in said slurry tank when said slurry tank is closed by said lid mechanism.

17. An apparatus according to claim 16, further comprising stirring means mounted on said lid mechanism for stirring the inorganic slurry in said slurry tank when said slurry tank is closed by said lid mechanism.

18. An apparatus according to claim 11, further comprising a servomotor connected to and driving said pump for applying said constant pressure.

* * * * *